(12) United States Patent
George

(10) Patent No.: US 9,410,624 B2
(45) Date of Patent: Aug. 9, 2016

(54) BI-DIRECTIONAL CLIP SEAL PISTON

(75) Inventor: Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1280 days.

(21) Appl. No.: 13/313,151

(22) Filed: Dec. 7, 2011

(65) Prior Publication Data

US 2012/0161400 A1  Jun. 28, 2012

Related U.S. Application Data

(60) Provisional application No. 61/426,085, filed on Dec. 22, 2010.

(51) Int. Cl.

| F16D 21/00 | (2006.01) |
|---|---|
| F16D 39/00 | (2006.01) |
| F16J 1/00 | (2006.01) |
| F15B 15/14 | (2006.01) |
| F16D 25/08 | (2006.01) |
| F16D 25/12 | (2006.01) |

(52) U.S. Cl.
CPC ............. *F16J 1/008* (2013.01); *F15B 15/1452* (2013.01); *F16D 25/082* (2013.01); *F16D 25/12* (2013.01); *F16D 2300/08* (2013.01)

(58) Field of Classification Search
USPC ......... 277/434, 435, 436, 437, 438, 439, 451; 192/48.619, 85.44, 85.54
See application file for complete search history.

(56) References Cited

U.S. PATENT DOCUMENTS

| 3,000,478 | A | * | 9/1961 | Carter .......................... 192/18 A |
| 3,650,364 | A | * | 3/1972 | Laing .......................... 192/85.32 |
| 3,837,439 | A | * | 9/1974 | Piret ............................. 188/72.6 |
| 3,844,393 | A | * | 10/1974 | Zaiser ........................ 192/48.619 |
| 3,848,518 | A | * | 11/1974 | Martin ............................. 92/107 |
| 4,082,171 | A | * | 4/1978 | Lalin et al. ................... 192/70.2 |
| 4,225,026 | A | * | 9/1980 | Yamamori et al. ............ 192/70.2 |
| 4,450,944 | A | * | 5/1984 | Fujioka et al. .............. 192/70.12 |
| 4,724,941 | A | * | 2/1988 | Wirkner ........................ 192/52.2 |
| 4,753,136 | A | * | 6/1988 | Hayakawa et al. ............ 475/146 |
| 6,752,252 | B2 | * | 6/2004 | Ichikawa .................... 192/85.41 |
| 7,063,197 | B2 | * | 6/2006 | Merkel et al. .............. 192/85.24 |
| 7,140,481 | B2 | * | 11/2006 | Hagenow ................... 192/85.42 |
| 8,056,692 | B2 | | 11/2011 | George |
| 8,162,116 | B2 | * | 4/2012 | Nohl et al. ................ 192/48.619 |
| 8,403,120 | B2 | * | 3/2013 | Voegtle et al. ........... 192/48.611 |
| 8,607,948 | B2 | * | 12/2013 | Sturgin et al. ................ 192/3.25 |
| 8,839,929 | B2 | * | 9/2014 | Kato et al. ................ 192/48.619 |
| 2008/0277228 | A1 | * | 11/2008 | George .......................... 192/48.1 |
| 2014/0346737 | A1 | * | 11/2014 | Harris et al. .................. 277/434 |

FOREIGN PATENT DOCUMENTS

| DE | 102008018210 | 11/2008 |
| EP | 0688970 | 12/1995 |
| EP | 1988304 | 11/2008 |

* cited by examiner

*Primary Examiner* — Kristina Fulton
*Assistant Examiner* — Eugene G Byrd
(74) *Attorney, Agent, or Firm* — Simpson & Simpson, PLLC

(57) ABSTRACT

A piston assembly, comprising: a back plate with an axially extending extrusion continuously circumferentially disposed about the back plate; a piston including an indent circumferentially disposed proximate an outer circumference for the piston plate; and a sealing element at least partially disposed in the indent. The piston is fixed to the back plate with a plurality of extruded rivets such that the extrusion forms a liquid-tight seal against a surface of the piston. The indent is open in an axial direction facing the back plate. The extrusion is radially inward of the plurality of extruded rivets.

10 Claims, 4 Drawing Sheets

BI-DIRECTIONAL CLIP SEAL PISTON

CROSS-REFERENCE TO RELATED APPLICATIONS

This application claims the benefit under 35 U.S.C. §119 (e) of U.S. Provisional Application No. 61/426,085 filed Dec. 22, 2010, which application is incorporated herein by reference.

TECHNICAL FIELD

The present disclosure relates to a clutch assembly, in particular, a clutch assembly with a clip seal for the assembly. The assembly includes a back plate configured to retain the seal and enable double-sided pressure loading of the assembly.

BACKGROUND

It is known to fabricate a clutch assembly with a machined piston having separate seals or a bonded seal.

SUMMARY

According to aspects illustrated herein, there is provided a piston assembly, including: a back plate with a circumferentially disposed axial extrusion; a piston including an indent circumferentially disposed proximate an outer circumference for the piston plate, the piston fixed to the back plate with a plurality of fasteners such that the extrusion forms a seal against a surface of the piston; and a sealing element at least partially disposed in the indent.

According to aspects illustrated herein, there is provided a piston assembly, comprising: a back plate with an axially extending extrusion continuously circumferentially disposed about the back plate; a piston including an indent circumferentially disposed proximate an outer circumference for the piston plate; and a sealing element at least partially disposed in the indent. The piston is fixed to the back plate with a plurality of extruded rivets such that the extrusion forms a liquid-tight seal against a surface of the piston. The indent is open in an axial direction facing the back plate. The extrusion is radially inward of the plurality of extruded rivets.

These and other objects and advantages of the present disclosure will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
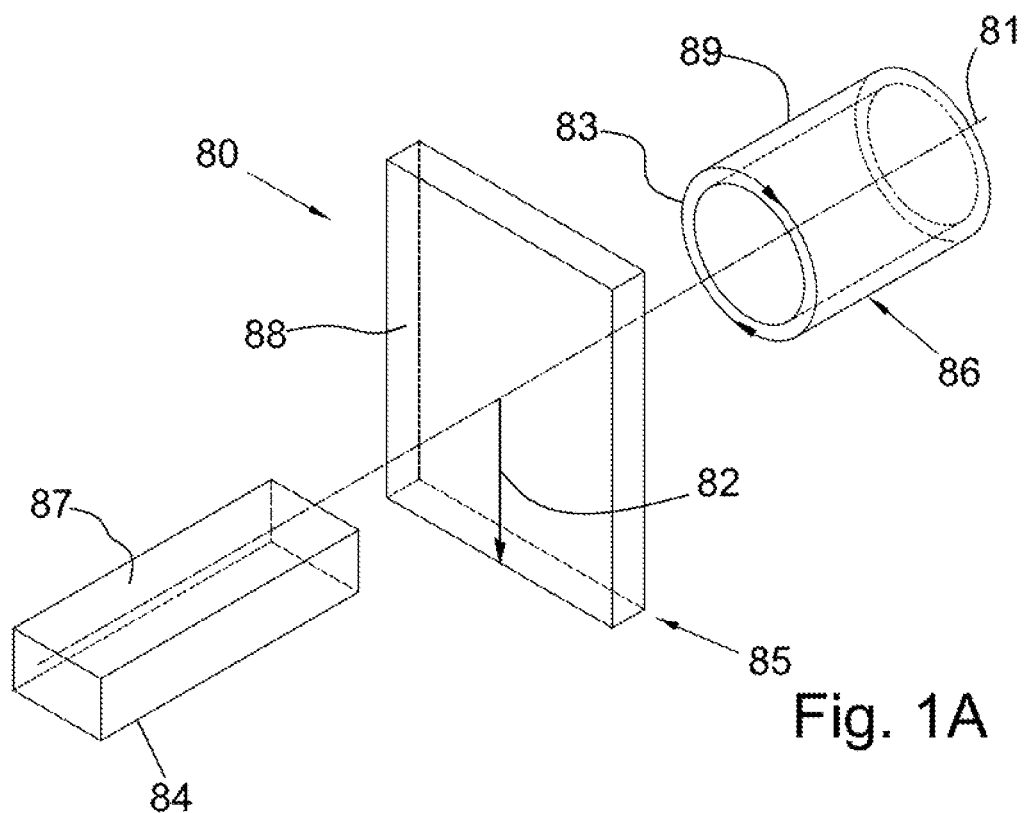
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
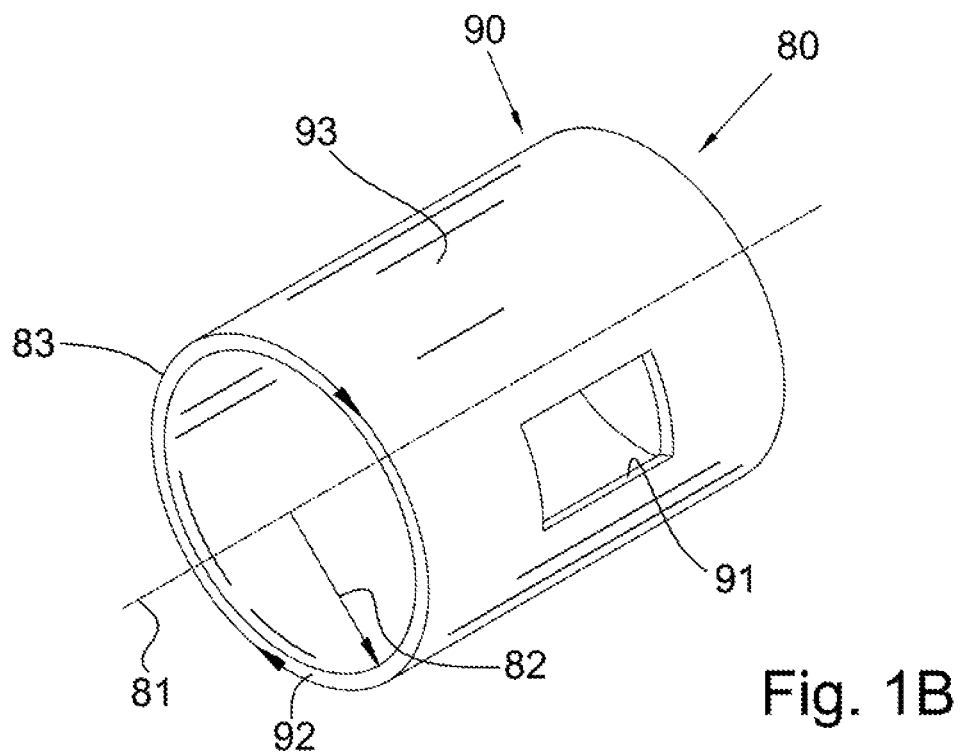
FIG. 1B is a perspective view of an object in the cylindrical coordinate system of FIG. 1A demonstrating spatial terminology used in the present application; and, FIG. 2 is a front view of a piston assembly with a clip seal.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
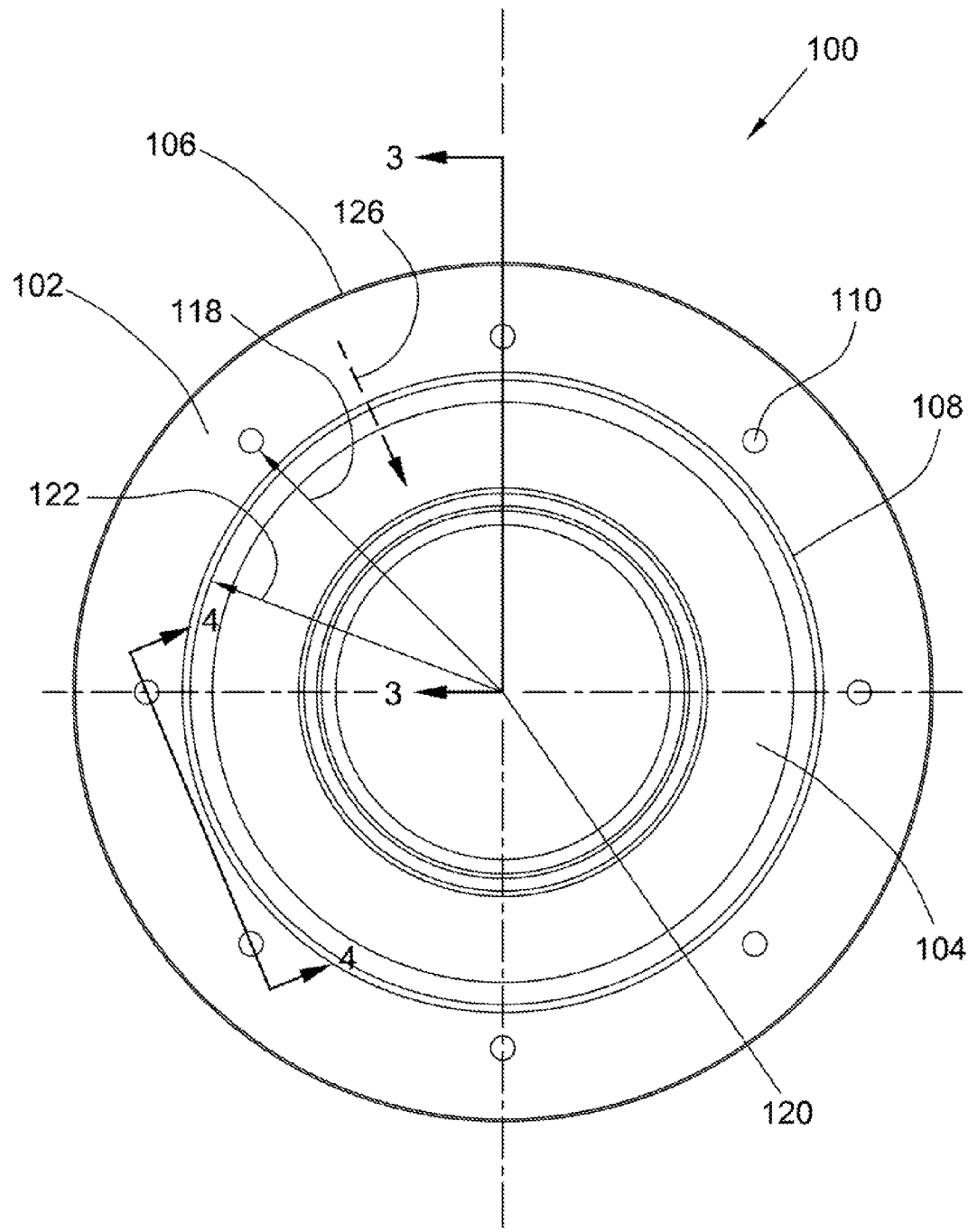

FIG. 2 is a front view of piston assembly 100 with a clip seal.

Figure 3:
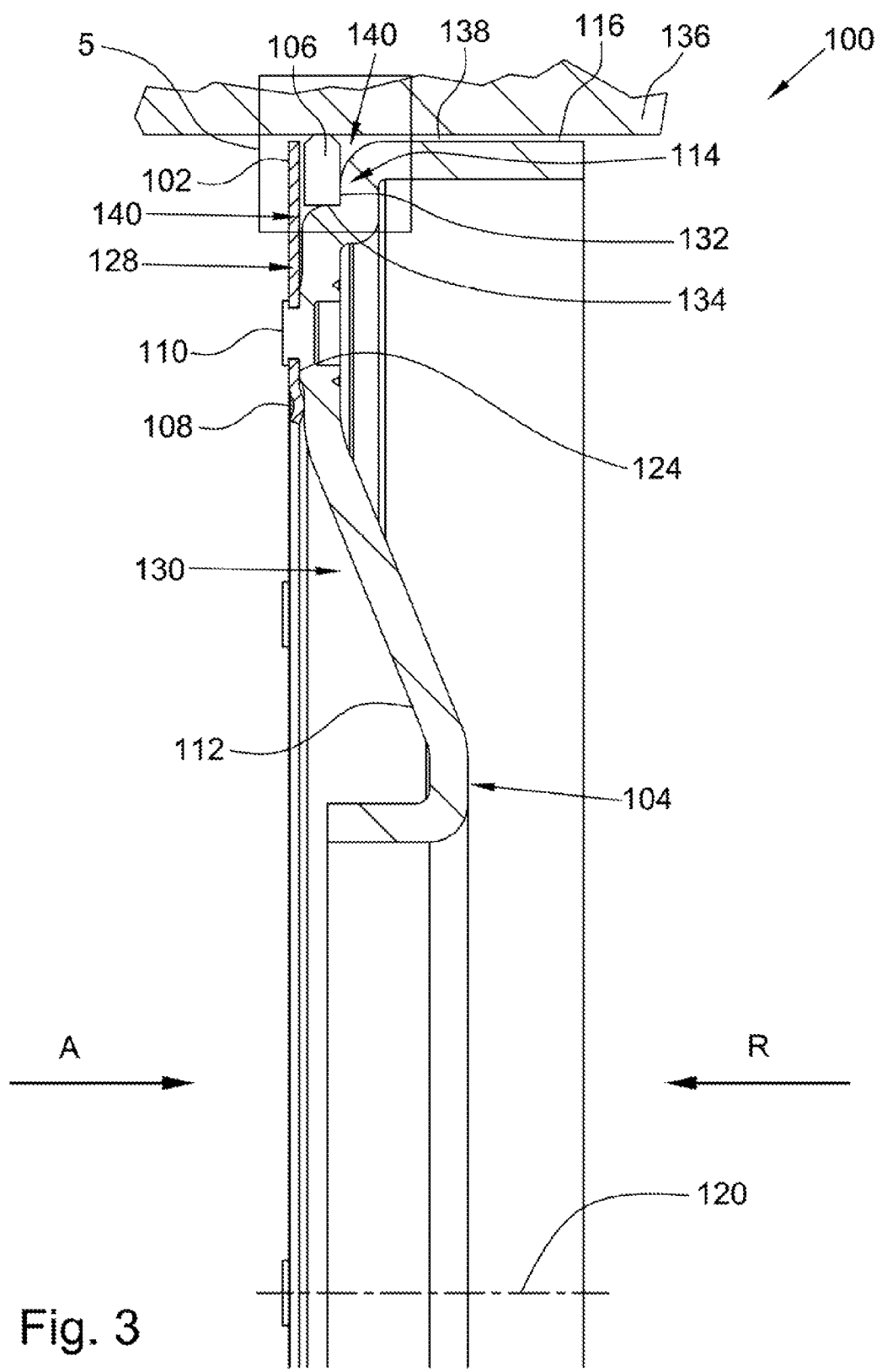
FIG. 3 is a partial cross-sectional view of the piston assembly shown in FIG. 2 generally along line 3-3 in FIG. 2 in a housing.

FIG. 3 is a partial cross-sectional view of piston assembly 100 shown in FIG. 2 generally along line 3-3 in FIG. 2. The following should be viewed in light of FIGS. 2 and 3. Piston assembly 100 includes back plate 102, piston 104, and sealing element 106. Element 106 may be a teflon seal, for example. The back plate includes circumferentially disposed extrusion 108. The piston and the back plate are fixedly connected via plurality of fasteners 110 such that the extrusion forms a seal against surface 112 of the piston. In an example embodiment, the fasteners are extruded rivets. The piston includes indent 114 circumferentially disposed proximate outer circumference 116 for the piston plate. The sealing element is at least partially disposed in the indent.

In an example embodiment, the extrusion is radially inward of the plurality of fasteners. In an example embodiment, the extrusion is continuous in a circumferential direction. In an example embodiment, the plurality of fasteners are at uniform radial distance 118 from longitudinal axis 120 for the assembly, and the extrusion is at uniform radial distance 122, less than radial distance 118, from the axis.

Figure 4:
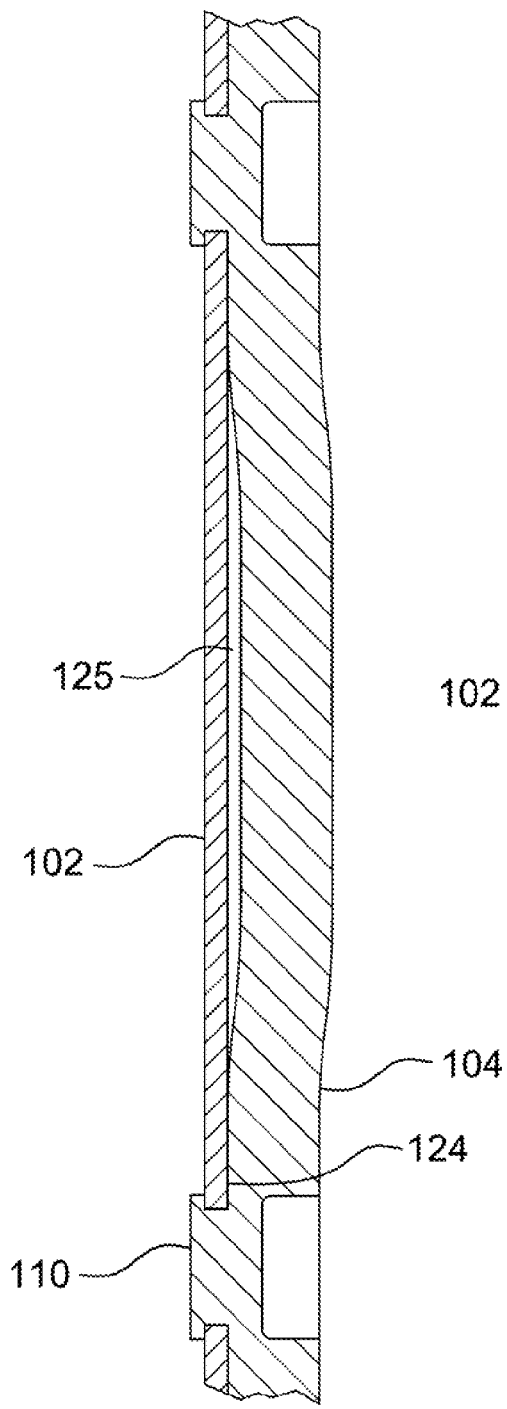
FIG. 4 is a cross-sectional view showing openings between the rivets shown in FIG. 2, generally along line 4-4 in FIG. 2; and, FIG. 5 is a detail of FIG. 3 showing the sealing element displaced against the back plate.

FIG. 4 is a cross-sectional view showing openings between the rivets shown in FIG. 2, generally along line 4-4 in FIG. 2. The following should be viewed in light of FIGS. 2 through 4. When extruded rivets are used for fasteners 110, areas 124, raised with respect to surface 112, are created around the rivets. The raised areas are not continuous between the rivets; therefore openings 125 are created between the back plate and the piston plate circumferentially between the raised areas, creating flow paths 126. Extrusion 108 creates a liquid-tight seal between portion 128 of the piston plate radially outward of the extrusion and portion 130 of the piston plate radially inward of the extrusion. The seal is discussed further infra.

To reduce fabricating cost and complexity, in an example embodiment, indent 114 is formed open-sided, for example, the indent includes only one radially disposed portion, or side, 132, and only one circumferentially disposed portion 134. Thus, a simple coining operation can be used to create the indent. At least a portion of the sealing element is axially disposed between the back plate and the piston. The back plate and the piston, in particular, portion 132, axially retain the sealing element, eliminating the need for a groove, with two radially disposed walls, in the piston. Creating a groove would be more complex and costly than creating indent 114.

The piston assembly is arranged to be placed within housing 136 such that the sealing element creates a seal with the housing. In an example embodiment, the housing is part of a transmission housing. In an example embodiment, the housing is part of a transmission housing and the piston assembly is part of a clutch in the transmission. Due to tolerances in manufacturing and material considerations, the radially inward circumference of the sealing element does not form a liquid-tight seal with the piston.

Figure 5:
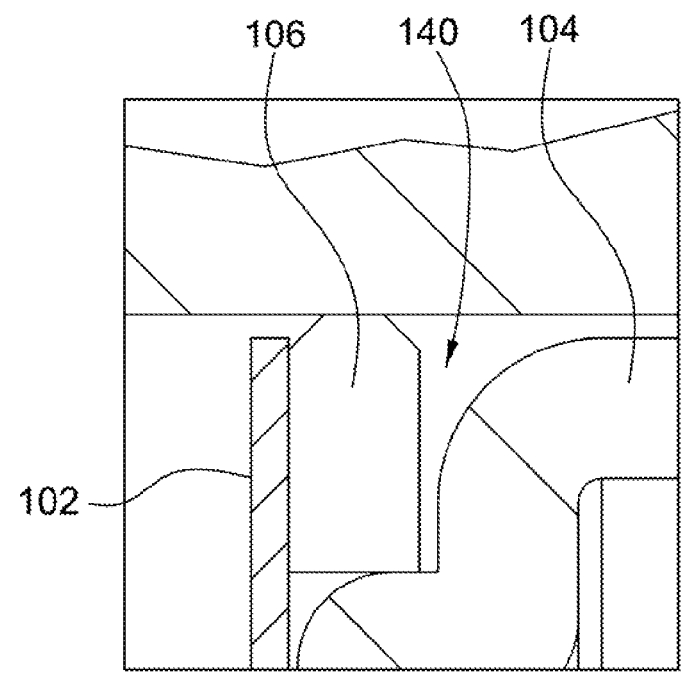

FIG. 5 is a detail of FIG. 3 showing the sealing element displaced against the back plate. When hydraulic pressure is applied to the piston in apply direction A, for example, to close a clutch, the sealing element creates a seal against the housing and there is no need to seal respective portions of surface 112 from each other. However, when hydraulic pressure is applied in release direction R, hydraulic fluid can leak around the piston through opening 138 between the piston and the housing. The fluid urges the sealing element against the back plate and flows through opening 140 created between the sealing element and the piston. The fluid continues past the radially inward circumference of the sealing element and through flow paths 126. However, advantageously, extrusion 108 creates a seal between the back plate and the piston and the fluid is contained. Without the extrusion, the flow of fluid would be unabated, limiting the amount of pressure that could be generated by the hydraulic fluid in direction R to release the clutch. This limitation of pressure could adversely impact operation of the piston assembly or could limit the applications for which the piston assembly could be used.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:
1. A piston assembly, comprising:
an axis;
a back plate with a circumferentially disposed axial extrusion;
a piston including:
a plurality of raised areas; and,
an indent radially outward of the raised areas and circumferentially disposed proximate an outer circumference for the piston;
a plurality of fasteners:
extending axially from the plurality of raised areas, and,
fixing the back plate to the piston;
at least one space:
axially disposed between the back plate and the piston; and,
circumferentially disposed between first and second raised areas included in the plurality of raised areas; and,
a sealing element at least partially disposed in the indent, wherein:
the plurality of fasteners are radially located between the sealing element and the axis; and,
the extrusion is in direct contact with the piston and forms a seal against a surface of the piston.
2. The piston assembly of claim 1, wherein the extrusion is radially inward of the plurality of fasteners.
3. The piston assembly of claim 1, wherein the extrusion is continuous in a circumferential direction.
4. The piston assembly of claim 1, further comprising a longitudinal axis, wherein:
the plurality of fasteners are at a first uniform radial distance from the longitudinal axis; and,
the extrusion is at a second uniform radial distance, less than the first radial distance, from the axis.
5. The piston assembly of claim 1, wherein the extrusion creates a liquid-tight seal between a portion of the piston radially outward of the extrusion and a portion of the piston radially inward of the extrusion.
6. The piston assembly of claim 1, wherein the indent includes only one radially disposed portion and only one circumferentially disposed portion.
7. The piston assembly of claim 1, wherein the piston assembly is arranged to be placed within a housing such that the sealing element creates a seal with the housing.
8. The piston assembly of claim 7, wherein the housing is part of a transmission housing.
9. The piston assembly of claim 1, wherein:
at least a portion of the sealing element is axially disposed between the back plate and the piston; and,
the back plate and the piston restrain the sealing element in an axial direction.
10. A piston assembly, comprising:
a back plate with an axially extending extrusion continuously circumferentially disposed about the back plate;

a piston including:
  a plurality of raised areas;
  an indent radially outward of the raised areas and circumferentially disposed proximate an outer circumference for the piston; and,
  a plurality of extruded rivets:
    extending from the plurality of raised areas; and,
    fixing the back plate to the piston;
at least one space:
  axially disposed between the back plate and the piston; and,
  circumferentially disposed between first and second raised areas included in the plurality of raised areas; and,
a sealing element at least partially disposed in the indent, wherein:
  the piston is fixed to the back plate with the plurality of extruded rivets such that the extrusion is in direct contact with the piston and forms a liquid-tight seal against a surface of the piston;
  the indent is open in an axial direction facing the back plate; and,
  the extrusion is radially inward of the plurality of extruded rivets.

\* \* \* \* \*